United States Patent [19]

Cairns

[11] Patent Number: 4,561,418

[45] Date of Patent: Dec. 31, 1985

[54] BARBECUE GRILL

[76] Inventor: Gordon Cairns, 23639 Country Villa Rd., Ramona, Calif. 92065

[21] Appl. No.: 629,956

[22] Filed: Jul. 11, 1984

[51] Int. Cl.[4] ............................................. A47J 37/00
[52] U.S. Cl. .............................. 126/41 R; 126/25 A; 126/4; 99/340; 99/390; 99/391; 73/296
[58] Field of Search .................. 126/9 R, 25 R, 25 A, 126/41 R, 4; 99/339, 389, 390, 391, 402, 419, 421 HH, 340; 219/386, 404

[56] References Cited

U.S. PATENT DOCUMENTS

| | | | |
|---|---|---|---|
| 2,441,190 | 5/1948 | Fuller | 126/25 R |
| 2,923,229 | 2/1960 | Halford | 99/390 X |
| 2,946,275 | 7/1960 | Compton | 99/390 |
| 3,091,170 | 5/1963 | Wilson | 99/390 |
| 3,182,585 | 5/1965 | Rensch et al. | 99/391 X |
| 3,276,351 | 10/1966 | Sundholm | 126/25 R X |
| 3,285,238 | 11/1966 | Norlie | 126/25 A X |
| 3,302,555 | 2/1967 | Burwell | 126/25 R X |
| 3,324,788 | 6/1967 | La France | 99/389 |
| 3,358,585 | 12/1967 | Scherer | 126/25 A X |
| 3,547,097 | 12/1970 | Rice | 126/4 |
| 4,120,237 | 10/1978 | Mecherlen | 126/9 R X |
| 4,245,505 | 1/1981 | Baynes | 126/41 R X |

FOREIGN PATENT DOCUMENTS

| | | | |
|---|---|---|---|
| 231482 | 12/1960 | Australia | 99/390 |
| 857861 | 10/1952 | Fed. Rep. of Germany | 126/39 R |
| 80828 | 5/1963 | France | 99/390 |

Primary Examiner—Margaret A. Focarino
Attorney, Agent, or Firm—Charmasson & Holz

[57] ABSTRACT

A barbecue grill for outdoor cooking has vertical spaced heating panels between which foodstuffs can be supported for cooking. One of the panels is slidable towards and away from the other panel to control the amount of heat supplied to the cooking area between the panels, and is pivotable outwards away from the cooking area about a vertical pivot axis at one side edge for easier access to the cooking area.

11 Claims, 13 Drawing Figures

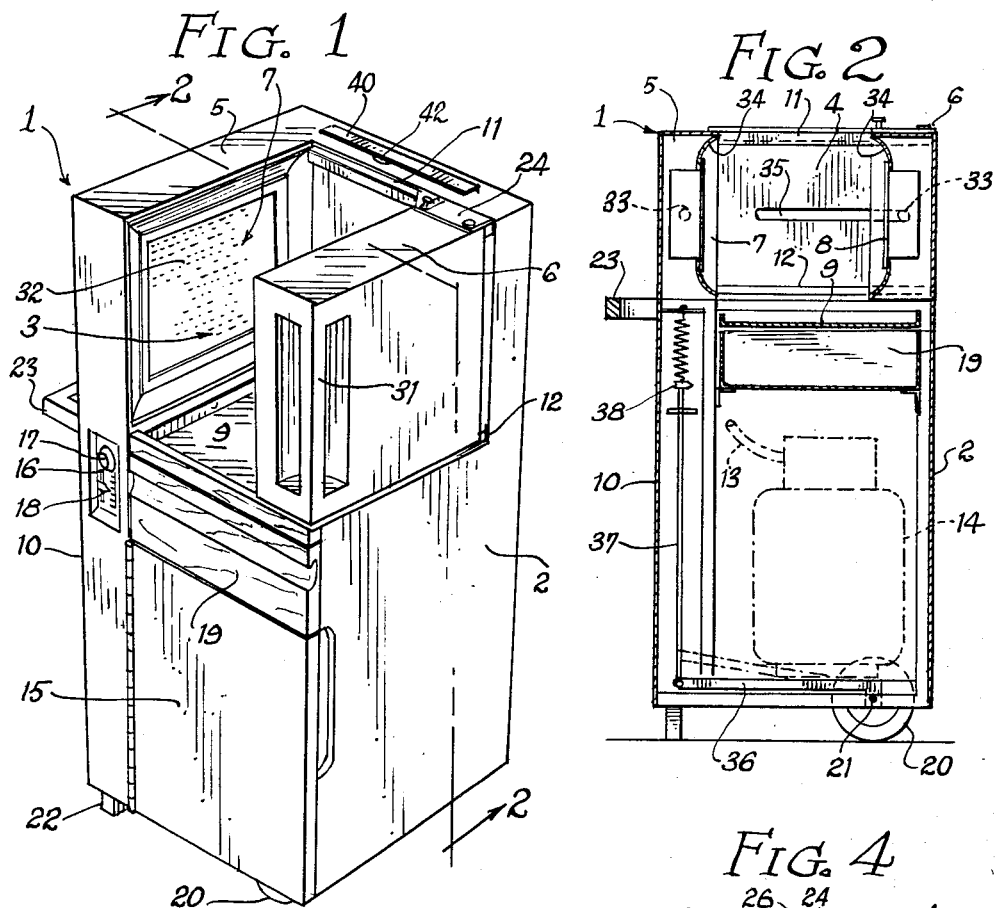
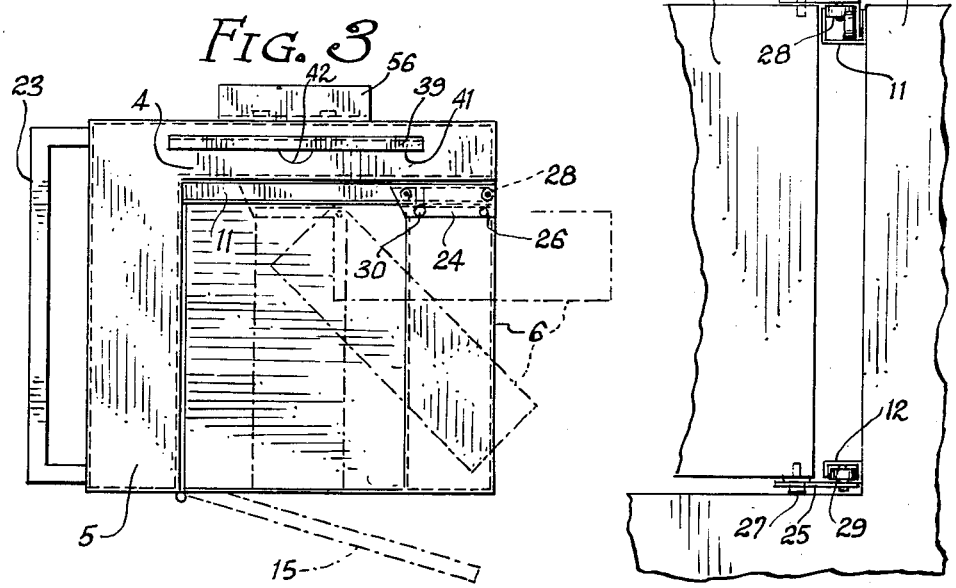

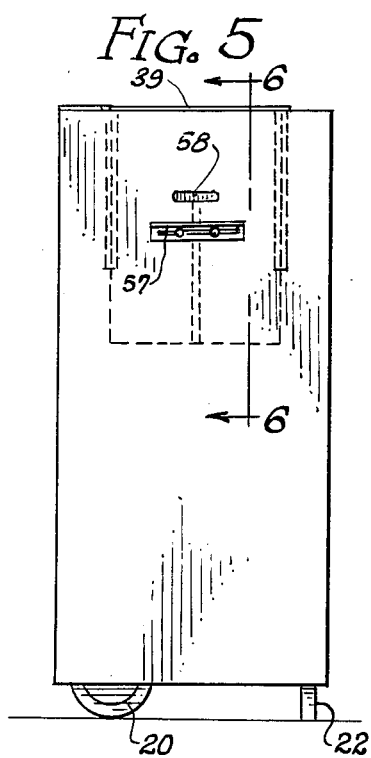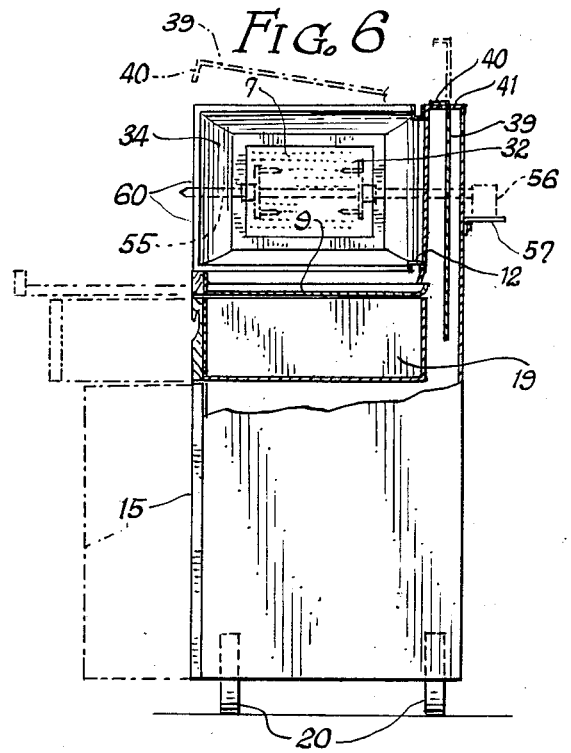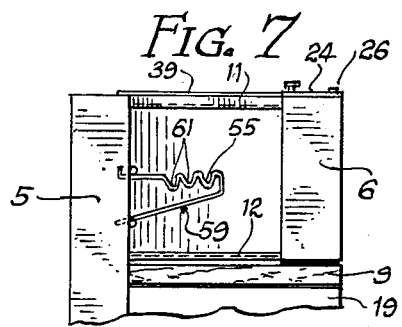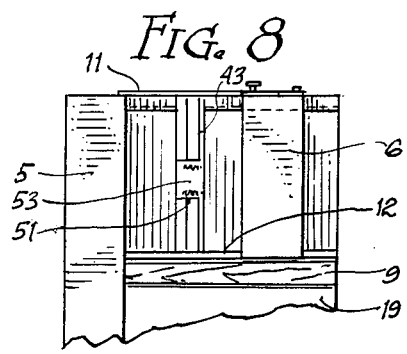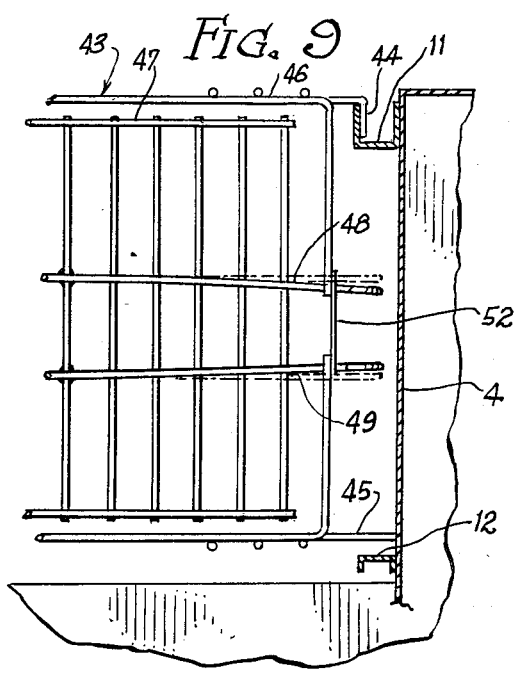

BARBECUE GRILL

BACKGROUND OF THE INVENTION

The present invention relates to a barbecue grill for outdoor cooking of the type having vertical spaced heating panels between which foodstuffs can be supported for cooking.

Vertical barbecue grills of this type have the advantage that grease, fat, and other cooking residues do not drip onto the heating panels but can be caught in a drip pan below the cooking area. However some fat will often splatter outwards onto the heating panels. The fuel for such grills is commonly some form of solid fuel such as barbecue coals, which has a relatively long warm-up time before cooking can be started and which is fairly messy to clean up after cooking.

Vertical barbecue grills are often designed with one or both of the panels slidably mounted so that they can be moved inwards or outwards to control the amount of heat supplied to the cooking area.

SUMMARY OF THE INVENTION

It is an object of the present invention to provide a barbecue grill having spaced vertical heating panels which is conveniently adjustable to alter the spacing between the panels and to allow easy access to the cooking area.

According to the present invention a barbecue grill having vertical spaced heating panels is provided, in which a drip pan for collecting food wastes is mounted below the cooking area defined between the panels and at least one of the panels is mounted so as to be slidable towards and away from the other panel to control the amount of heat supplied to the cooking area. The slidable panel is pivotally mounted about a vertical pivot axis at one side edge, so that it can be pivoted outwards away from the cooking area.

Thus by pivoting the slidable panel outwards, easier access to the cooking area, for example for cleaning purposes, is provided. Also, when the panel is pivoted outwards it provides a convenient outdoor heater, for example when food cooked on the barbecue grill is eaten outdoors.

Preferably, the heating panels comprise gas burner plates or elecrically heated panels, so that they are more or less immediately ready for cooking when turned on, and require little or no cleaning after cooking. Gas is a relatively inexpensive and clean fuel, and will cost considerably less than barbecue coals for outdoor cooking.

In a preferred embodiment of the invention, the grill comprises a vertical housing having a lower enclosed area and an upper, three sided cooking area. The cooking area is preferably arranged at a height suitable for cooking from a standing position. The three sides of the cooking area comprise a back panel, and opposing side panels comprising the spaced heating panels. At least one of the spaced heating panels is slidably mounted at its inner edge in a slide rail or rails provided in the back panel. The slide mounting preferably comprises a plate pivoted to the side edge of the panel and slidably engaged in the slide rail. A suitable releasable spring pin may be provided to prevent the slide panel from pivoting outwards about the plate during sliding movement and cooking. The pin can be released when the panel is to be opened out. Pivot plates may be provided at the upper and lower faces of the panel adjacent its side edge to engage in upper and lower slide rails in the back panel, for better stability.

Where the heating panels incorporate gas burner plates, a gas supply may be mounted in the enclosed area of the housing below the cooking area. A level monitor and control valve for the gas supply may be provided. The connection of the sliding panel to the gas supply can be provided through a suitable horizontal slot in the back panel, to allow for the sliding movement of the sliding panel.

The drip pan may be formed in the upper face of the lower enclosed area of the housing below the cooking area. Since access to the drip pan for cleaning is allowed by pivoting the heating panel outwards, the drip pan need not be removable and may simply be lined with aluminum foil for easy cleaning. However, a removable drip pan may be provided, which may either slide or lift out of the housing.

In this embodiment of the invention the vertical housing is relatively solid and stable and allows food to be conveniently cooked in a standing position.

Foodstuffs to be cooked can be supported between the heating panel on suitable vertical support devices. For example, a vertical clamp-type basket for holding substantially flat pieces of meat or fish between vertical grill plates may be designed to be hooked onto the slide rail on the back panel. Thus the support device can be moved along the slide rail as the sliding panel is moved, so that it is always centrally located between the heating panels for even cooking on both sides.

The barbecue grill is preferably also designed so that a rotisserie can be conveniently mounted between the heating panels. In a preferred embodiment a mounting for a rotisserie motor is provided in the back face of the back panel, and the rotisserie axle extends through a horizontal slot or aligned slots in the back panel into the cooking area. The motor and axle can be moved along the mounting and slot to re-center them when the sliding panel is moved. A support device for the free end of the axle is preferably provided. The support device can be mounted in one or other of the heating panels so as to extend across the front open face of the cooking area. The device has a series of recesses or indents for supporting the free end of the axle in any of a plurality of locations between the panels.

Since the rotisserie motor is mounted on a back face of the housing it is completely shielded from the heat of the cooking area and thus protected from heat damage.

The barbecue grill of this invention is thus readily adjustable to vary the amount of heat supplied to the cooking area, and can be converted to act as a space heater. When gas burner plates are used in the heater panels, it is relatively clean, inexpensive to use, and ready to cook foodstuffs in little or no time after the plates are turned on.

BRIEF DESCRIPTION OF THE DRAWINGS

FIG. 1 is a perspective view of a barbecue grill according to a preferred embodiment of the invention;

FIG. 2 is a sectional view of the grill on the lines 2—2 of FIG. 1;

FIG. 3 is a top plan view of the grill showing various positions of the sliding, pivotal panel;

FIG. 4 is a partial right hand elevation of the grill showing the sliding mounting of one of the heating panels;

FIG. 5 is a rear elevation of the barbecue grill;

FIG. 6 is a partial vertical section of the lines 6—6 of FIG. 5;

FIG. 7 is a front elevation of the cooking area of the grill showing the mounting of a support for a rotisserie spit;

FIG. 8 is a similar view to FIG. 7, showing a vertical clamp basket supported in the cooking area;

FIG. 9 is a partial sectional viwe on the lines 9—9 of FIG. 8, showing the support of the clamp basket on the back panel of the cooking area;

DESCRIPTION OF THE PREFERRED EMBODIMENT

Figure 10:
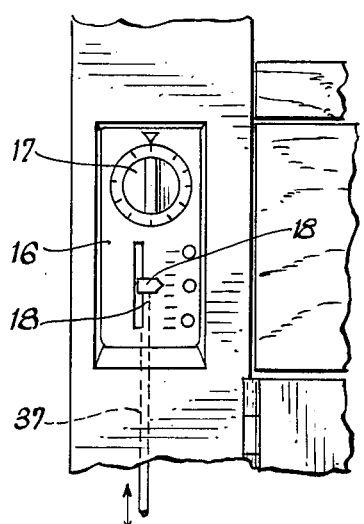
FIG. 10 shows the control panel of the barbecue grill in more detail.

The drawings show a preferred embodiment of a barbecue grill according to the invention.

As shown in FIG. 1, the barbecue grill comprises a vertical housing 1 having a lower enclosed area 2 and an upper, three-sided cooking area 3. The height of the housing is preferably such that the average individual can conveniently cook foodstuffs in the cooking area from a standing position.

The cooking area 3 is defined by a back panel 4 and opposed, spaced side panels 5, 6 in which heating plates or elements 7, 8 are mounted. A drip pan 9 for collecting food wastes or debris is mounted below the cooking area 3 in the upper face of the lower enclosed area 2 of the housing. Each heating panel 5 is slidably mounted in spaced upper and lower rails or tracks 11, 12 extending horizontally across the back panel 4, as will be described in more detail below in connection with FIGS. 3 and 4. In an alternative embodiment only one of the panels is pivotally mounted.

In the preferred embodiment of the invention the heating plates 7 and 8 comprise gas burners connected via internal pipelines, schematically indicated at 13 in FIG. 2, to a gas supply 14 mounted in the lower enclosed area 2 of the housing. An access door 15 is provided at the front of the housing to allow the gas supply 14, which may be a camping gas canister, to be replaced when necessary.

A control panel 16 is mounted on the front face of the housing as seen in FIG. 1 and includes a gas flow control knob 17 connected to a suitable control valve in the gas pipelines, and a gas level monitor 18 which monitors the level of gas remaining in the supply 14, as will be described in more detail below.

Also provided in the front face of the housing below the cooking area 3 is a pull-out accessory drawer 19, as shown in FIGS. 1 and 6, which can be used for storing cooking utensils and supplies. The drip pan 9 is located above the drawer 19 and may also be designed to pull out as shown in FIG. 6.

The entire barbecue housing 1 is a relatively solid and stable construction, and can be moved from one place to another when necessary in wheelbarrow fashion on a pair of wheels 20 mounted on axle 21 at the right hand side of the housing. A pair of legs 22 are provided at the opposite side of the housing to support it when stationary, and a handlebar 23 is mounted on the left hand face for tipping the housing to the right and pushing it on the wheels 20.

The mounting of the slidable heating panels 5 and 6 will now be described in more detail with reference to FIGS. 3 and 4. The panels 5 and 6 is slidably mounted in the rails 11 and 12 by means of upper and lower plates 24, 25 which are pivoted about pins 26, 27, respectively, to the upper and lower faces of the panel. Upper and lower sets of rollers or runners 28, 29 are mounted on the upper and lower plates, respectively, to serve as bearings to run in the rails 11 and 12 as shown in FIG. 4. A spring release pin 30, seen in FIG. 3, normally connects the upper pivot plate 24 to the panel 6 to prevent the panel from pivoting out about the pivots 26 and 27. Thus for normal sliding movement of the panels 5 and 6 along the tracks, the release pin will be in its locking or retaining position. When it is desired to pivot the panels outwards away from the cooking area, for example to the dotted line positions shown in FIG. 3, the pin 30 is released and the panels can then be pivoted outwards. A handle 31 is provided on the panel 6 to aid in pivoting the panels outwards (see FIG. 1).

In this way the heating panels 5 and 6 can be moved back and forth along the slide rails to alter the spacing between the panels 5 and 6 for cooking, and can be pivoted outwards for easier access to the cooking area 3 when desired. In its pivoted out position the panels 5 and 6 can also act as an outdoor heater when food is eaten outdoors, for example.

The gas burners in each of the heating panels preferably comprise ceramic plates 32 with multiple apertures or holes across their faces forming burner orifices and horizontal supply pipes 33 for supplying gas to the plates 32. The burners are mounted in bevelled recesses 34 formed in the opposing front faces of the heating panels, and the supply pipes 33 are connected to the connecting pipelines of the gas supply 14 through the front face of the back panel 4. A horizontal slot 35 (see FIG. 2) is provided in the front face of the back panel to allow the sliding panel gas burners to be connected to the gas pipeline while still allowing sliding movement of these panels.

Thus each of the ceramic burner plates can be lit at their front faces to supply immediate heat to the cooking area and the heat intensity can be manually controlled by turning the control knob 17. Although the heating plates 7, 8 comprise gas burners in the preferred embodiment, other types of fuel may be used, for example electrical burners.

As mentioned above, a gas monitor 18 is provided for monitoring the level of gas in the supply 14. The operation of the monitor 18 can be understood with reference to FIGS. 2 and 10. The gas supply canister is supported on a mounting frame or panel 36 which is pivoted at its forward end on the wheel axle 21 and supported at its opposite end on spring cables 37 tied at their upper ends to an upper part of the lower area 2 of the housing. Thus when the gas canister is full and heavy, the panel 36 will tilt down, stretching the cables 37, and will slowly move up as the canister empties. An indicator arrow 38 of the monitor 18 is secured to one of the cables 37 as shown in FIG. 10, and thus the arrow 38 will also move up and down as the end of the panel 36 moves up and down. The lowest position on the level monitor 18 therefore indicates that the gas canister is full, and the highest position indicates that it is empty and needs to be replaced.

Another feature of the barbecue grill is the lift-up lid 39 which can be used to cover the cooking area 3 when desired. The lid 39 has an inturned lip 40 at its upper edge and can be stored in the back panel 4 as shown in FIG. 6. A horizontal slot 41 is provided in the upper face of the back panel for this purpose, and the lip 40 will rest on the upper face. A finger opening 42 in the upper face (see FIG. 3) allows the lid 39 to be raised as shown in FIG. 6 and rotated down into a position covering the cooking area.

When the grill is to be used for cooking foodstuffs, the panel 6 is moved to the desired position and a suitable food support is placed in the cooking area 3. FIGS. 7 and 9 show some examples of suitable food support devices.

In FIGS. 8 and 9 a vertical meat clamp basket 43 is mounted by means of a hook 44 in the upper slide rail 11 of the back panel 4. A bottom rest or projection 45 of the basket holds the basket in a proper vertical position spaced from the back panel as shown in FIG. 9. Thus the meat basket 43 can slide or be moved along the rail 11 to any desired position between the panels 5 and 6 and is suitably centrally located between the panels as shown in FIG. 8. If the panel 6 is moved to change the heat intensity during cooking, the meat basket 43 can be moved correspondingly to maintain its central position and ensure even cooking on both sides of food such as meat or fish steaks held in the basket.

Figure 11:
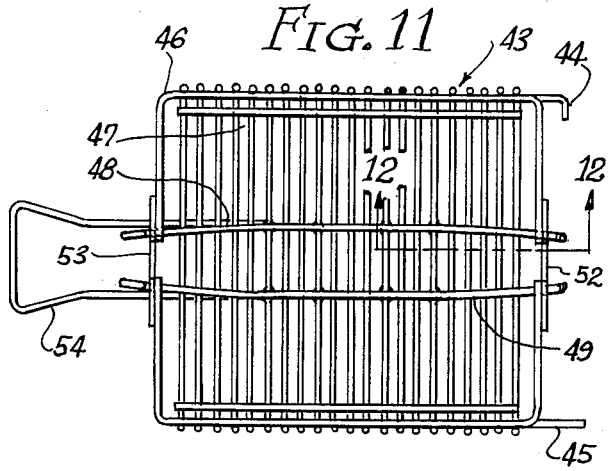
FIG. 11 shows a plan view of the meat clamp basket.
Figure 13:
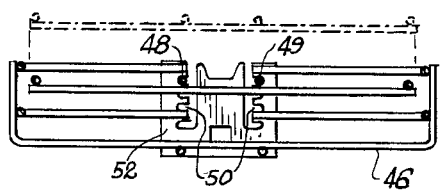
FIG. 13 is a view on the lines 13—13 of FIG. 12.
Figure 12:
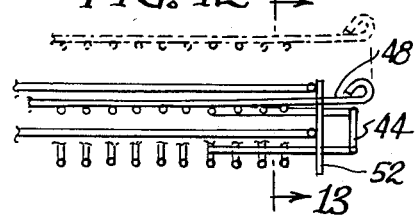
FIG. 12 is a view on the lines 12—12 of FIG. 11.

The meat clamp basket 43 is shown in more detail in FIGS. 11 to 13. It comprises a wire grid basket shaped frame 46 with a flat grid plate 47 movably mounted over the open face of the frame to clamp a steak, for example, in a vertical orientation. The grid plate 47 has horizontal spaced support wires 48, 49 which project out of the frame 46 at each side and engage in notches 50, 51 provided in end plates 52, 53 mounted on opposite sides of the frame (see FIG. 13). The wires 48, 49 are springy at their outer ends, and thus the plate 47 can be moved to a new position by forcing the ends of the wires together to release them from their respective notches, moving the plate in or out to a new position, and then releasing the wires so that they engage in the aligned notches in that position. Thus the clamp basket can be arranged to hold foods over a range of different thicknesses. The basket is provided with a handle 54 to allow it to be moved easily.

In FIGS. 6 and 7 a rotisserie spit 55 is shown mounted so as to project across th cooking area 3. The mounting allows the rotisserie position to be adjusted so that it is centrally located between the panels 5 and 6. The rotisserie is of the type comprising a motor 56 for rotating the spit 55 on which foodstuffs such as joints, chickens, and the like may be spitted. A mount 57 for the motor 56 is secured to the back face of the back panel 4, as shown in FIGS. 5 and 6, and a suitable horizontal slot 58 in the back face is aligned with the slot 35 in the front face to allow the spit 55 to project through the aligned slots into the cooking area as shown in FIG. 6. The lid 39 is preferably also provided with a suitable horizontal slot (not shown) aligned with the slots 30 and 58 when the lid is in its retracted position, to allow the rotisserie to be used whether the lid is retracted or covering the cooking area.

A support frame 59 for the free end of the spit 55 can be mounted as shown in FIG. 7 in openings 60 in the side panel 5 so as to extend across the front of the cooking area. The frame 59 basically comprises a bent wire frame having a series of recesses 61 for supporting the free end of the spit in various positions. Thus the rotisserie spit can be moved along the aligned slots in the back panel to a desired position between the side panels, with its free end supported in an appropriate one of the recesses 61. The rotisserie motor mount 57 is long enough to allow for horizontal positioning of the rotisserie motor and spit. Since the motor is shielded from the cooking area 3 by the back panel 4, it is protected from any damage from heat in the cooking area.

Thus relatively flat foodstuffs or meats such as beef or fish steaks and the like can be supported vertically by the meat basket 43 between the heating panels, and foodstuffs such as joints of meat or poultry can be spitted on the rotisserie spit 55 and rotated between the panels.

If more or less intense heat is desired, the gas supply can be adjusted and/or the sliding panel 6 can be moved towards or away from the fixed panel 5, with the meat basket 45 or rotisserie also being moved to a new, central position.

When cooking is completed, the sliding panel 6 may be pivoted outwards if desired for easier access to the cooking area 3. If food is to be eaten outdoors, the gas supply may be left on with the panels 5 and 6 pivoted outwards to act as a heater.

Pivoting out of the panels 5 and 6 also allows access to the drip pan 9 for clean-up of cooking debris. Thus the drip pan 9 need not be slidable or removable, as shown in FIG. 6, but could be an integrally formed recess in the upper face of the lower enclosed area 2 of the housing. The drip pan 9 may be lined with aluminum foil during cooking to make the clean-up easier.

Although in the preferred embodiment of the invention both heating panels are slidably and pivotally mounted, only one of the panels 5 and 6 may be slidable and pivotal on the panel 4 in the same way.

The barbecue grill of this invention is conveniently adjustable to alter the spacing between the vertical heating panels, and can be used as an outdoor heater when food is eaten outdoors. It is suitable for use on a patio or in a backyard, and can be moved from place to place when necessary by wheels allowing it to be moved in a wheelbarrow fashion.

The housing 1 is suitably metallic or of high temperature plastics material, and the recessed front faces of the heating panels may be of stainless steel. The front face of the back panel facing the cooking area is preferably of a reflective material.

The cooking area is at a convenient height for cooking, so that the cook does not have to repeatedly bend over during cooking, and the housing incorporates a convenient drawer at hand height for storage of cooking utensils and supplies. The housing provides a relatively solid and stable construction for the barbecue grill. In the preferred embodiment the heating panels incorporate gas burners connected to a gas supply which is conveniently mountd in a cabinet formed in the lower enclosed area of the barbecue housing. Gas as a cooking fuel is relatively clean and inexpensive, and the gas burner plates will stay relatively clean since most of the cooking fats and debris will fall down into the drip pan.

Thus a barbecue grill which is stable and relatively easy to use and adjust during cooking in a standing position has been provided. The grill is relatively easy to keep clean, uses an inexpensive fuel, is immediately ready to use when the fuel supply is turned on, and can be converted to an outdoor space heater when food is eaten outdoors.

While the invention has been particularly shown and described with reference to the preferred embodiment, it will be understood that modifications can be made to the disclosed embodiment without departing from the scope of the invention, which is defined in the appended claims.

What is claimed is:

1. A barbecue grill comprising:
   vertical, spaced radiant heating panels defining a cooking area therebetween;
   at least one gas burner mounted within each heating panel;
   a back panel defining a back face of said cooking area;
   horizontal slide rail means across said back panel;
   bearing means on each of said heating panels for sliding engagement within said rail means, so that said heating panels are slidable towards and away from each other;
   means for pivotally mounting said panels to said bearing means about a vertical axis;
   a supply of pressurized combustible gas;
   lines for transporting gas from said supply to said gas burners
   means for allowing movement of said lines as said heating panels are slid and pivoted throughout their range of movement;
   a drip pan for collecting food wastes mounted below the cooking area; and
   means for converting said grill to a radiant space heater by pivoting each of said heating panels about a vertical pivot axis so that each faces outwards and away from said cooking area.

2. The barbeque grill as claimed in claim 1, wherein said pivoting means comprises a plate pivotally mounted on said sliding panels and secured to said bearing means.

3. The barbecue grill as claimed in claim 1, wherein said back panel has upper and lower spaced horizontal slide rails, and said pivoting means comprises upper and lower pivot plates slidably engaged in said slide rails and pivotally mounted about said pivot axis on said slidable panels.

4. The barbecue grill as claimed in claim 3, including a releasable retaining pin for releasably securing said upper pivot plate to said panels, said pin being movable between a locking position in which said panels are prevented from pivoting and a released position allowing said panels to pivot about said plate.

5. The barbecue grill as claimed in claim 1, which further comprises a vertical housing, said housing having an enclosed area below said cooking area, and said cooking area being at a height suitable for cooking from a standing position.

6. The barbecue grill as claimed in claim 5, wherein said gas supply is mounted in said enclosed area of said housing, and said enclosed area includes means for supporting said gas supply.

7. The barbecue grill as claimed in claim 6, including gas level monitor means for monitoring the level of gas in said supply, said support means comprising a spring mounted support and said monitor means being operatively linked to said support.

8. The barbecue grill as claimed in claim 5, including a lift up lid for covering said cooking area, said back panel having recess means for supporting said lid in a vertical retracted position when not in use.

9. The barbecue grill as claimed in claim 5, including means for mounting a rotisserie motor on the outer back face of said back panel, said back panel having a horizontal slot for allowing a rotisserie axle to project through said panel into said cooking area, said mounting means allowing movement of said motor and axle along said slot.

10. The barbecue grill as claimed in claim 1, including a meat support basket for vertical mounting in said cooking area, said basket including spaced grill plates for supporting foodstuffs and means for adjusting the spacing between said grill plates.

11. A barbecue grill comprising:
    a vertical housing having a lower enclosed area and an upper three sided cooking area at a height suitable for cooking from a standing position, the three sides of the cooking area comprising a back panel and spaced side panels; the side panels comprising radiant heater panels;
    means for slidably mounting said heater panels in the back panel so that they are movable towards and away from each other;
    means for pivotally mounting each heater panel for pivoting outwards away from said cooking area about a vertical axis at their rear side edges for converting said grill into an outdoor radiant space heater;
    means for mounting a gas supply in the lower enclosed area of said grill, said heating panels including gas burners;
    means for connecting said gas burners to said gas supply;
    said back panel having a first horizontal slot through which said connecting means pass for allowing sliding and pivoting movement of said panels;
    a retractable lid for covering said cooking area, said back panel having vertical recess means for supporting said lid in a vertical retracted position when not in use;
    means for mounting a rotisserie motor on the outer back face of said back panel;
    said back panel having a second horizontal slot and said retractable lid having a horizontal slot which is aligned with said second slot when said lid is retracted for allowing a rotisserie axle to project through said panel and lid and for allowing horizontal movement of said motor and axle along said slots to accommodate sliding movement of said panels;
    an adjustable meat basket having spaced grill plates for supporting meat between the plates and means for adjusting the spacing between the plates; and
    removable means for vertically mounting said meat basket in the cooking area, said basket mounting means including means for adjusting the horizontal position of said meat basket to accommodate sliding movement of said panels.

* * * * *